(12) United States Patent
Pais et al.

(10) Patent No.: US 9,524,079 B2
(45) Date of Patent: Dec. 20, 2016

(54) INFORMATION INTERCHANGE VIA SELECTIVE ASSEMBLY USING SINGLE GESTURE

(71) Applicant: MOTOROLA MOBILITY LLC, Libertyville, IL (US)

(72) Inventors: Martin R. Pais, North Barrington, IL (US); Rachid M. Alameh, Crystal Lake, IL (US); Paul B. Crosbie, Grayslake, IL (US); Gaurav Gupta, Lake Bluff, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 212 days.

(21) Appl. No.: 14/107,556

(22) Filed: Dec. 16, 2013

(65) Prior Publication Data

US 2015/0169147 A1 Jun. 18, 2015

(51) Int. Cl.
*G06F 3/048* (2013.01)
*G06F 3/0482* (2013.01)
*G06F 3/0488* (2013.01)

(52) U.S. Cl.
CPC ........... *G06F 3/0482* (2013.01); *G06F 3/0488* (2013.01); *G06F 3/04883* (2013.01)

(58) Field of Classification Search
CPC .................... G06F 17/30817; G06F 17/30828; G06F 17/30174; G06F 17/30265
See application file for complete search history.

(56) References Cited

U.S. PATENT DOCUMENTS

| | | | | |
|---|---|---|---|---|
| 6,317,739 | B1* | 11/2001 | Hirata | G06F 17/30395 |
| 8,510,677 | B2 | 8/2013 | van Os | |
| 2005/0216524 | A1* | 9/2005 | Gomes | G06F 17/30578 |
| 2007/0157101 | A1* | 7/2007 | Indiran | H04L 67/36 |
| | | | | 715/769 |
| 2009/0030971 | A1* | 1/2009 | Trivedi | G06F 3/0486 |
| | | | | 709/203 |
| 2009/0183088 | A1* | 7/2009 | Saka | H04L 29/06 |
| | | | | 715/751 |
| 2011/0167369 | A1* | 7/2011 | van Os | G06F 3/0483 |
| | | | | 715/769 |
| 2012/0182244 | A1* | 7/2012 | Arthur | G06F 3/023 |
| | | | | 345/173 |
| 2013/0132883 | A1* | 5/2013 | Vayrynen | G06F 3/0482 |
| | | | | 715/773 |
| 2013/0139092 | A1* | 5/2013 | Hang | H04M 1/72519 |
| | | | | 715/773 |
| 2014/0237378 | A1* | 8/2014 | Gonen | H04M 1/72519 |
| | | | | 715/745 |

OTHER PUBLICATIONS

Google Operating System, Unofficial news and tips about Google, Jul. 27, 2006, Google Talk Adds Voicemail and File Transfer, googlesystem.blogspot.com/2006/07/google-talk-adds-voicemail-and-file.html, all pages.

* cited by examiner

*Primary Examiner* — William Bashore
*Assistant Examiner* — Rayeez Chowdhury
(74) *Attorney, Agent, or Firm* — Shumaker & Sieffert, P.A.

(57) ABSTRACT

Disclosed are methods and devices for a gesture-enabled tool that enables a user to assemble a data bundle using a single continuous gesture to select items for the data bundle from a plurality of menus or lists and to deliver the data bundle to a recipient as part of the single continuous gesture.

15 Claims, 14 Drawing Sheets

INFORMATION INTERCHANGE VIA SELECTIVE ASSEMBLY USING SINGLE GESTURE

TECHNICAL FIELD

The present disclosure is related generally to selecting information displayed on a display screen and, more particularly, to selecting information using a single continuous stepwise gesture on a touch-sensitive display screen.

BACKGROUND

One of the challenges that continues to face designers of devices having user-engageable display screens, such as touch-sensitive display screens, pertains to providing enhanced functionality for users through gestures that can be employed with the devices. This is so, not only with devices having larger or multiple screens, but also in the context of devices having a smaller footprint, such as tablet PCs, hand-held devices, smaller multi-screen devices, etc.

One challenge with gesture-based input is that of providing secondary actions. For example, in touch-sensitive or touch interfaces today, it is common to tap on an item to launch the item. This makes it difficult to provide secondary functionality such as an ability to select items. Further, certain challenges exist with so-call pannable surfaces, e.g., surfaces that can be panned and have their content moved. For example, a pannable surface typically reacts to a finger drag and moves the content in the direction of the user's finger. If the surface contains objects that a user might want to re-arrange, it is difficult to tell whether the user wants to pan the surface or to re-arrange the content.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
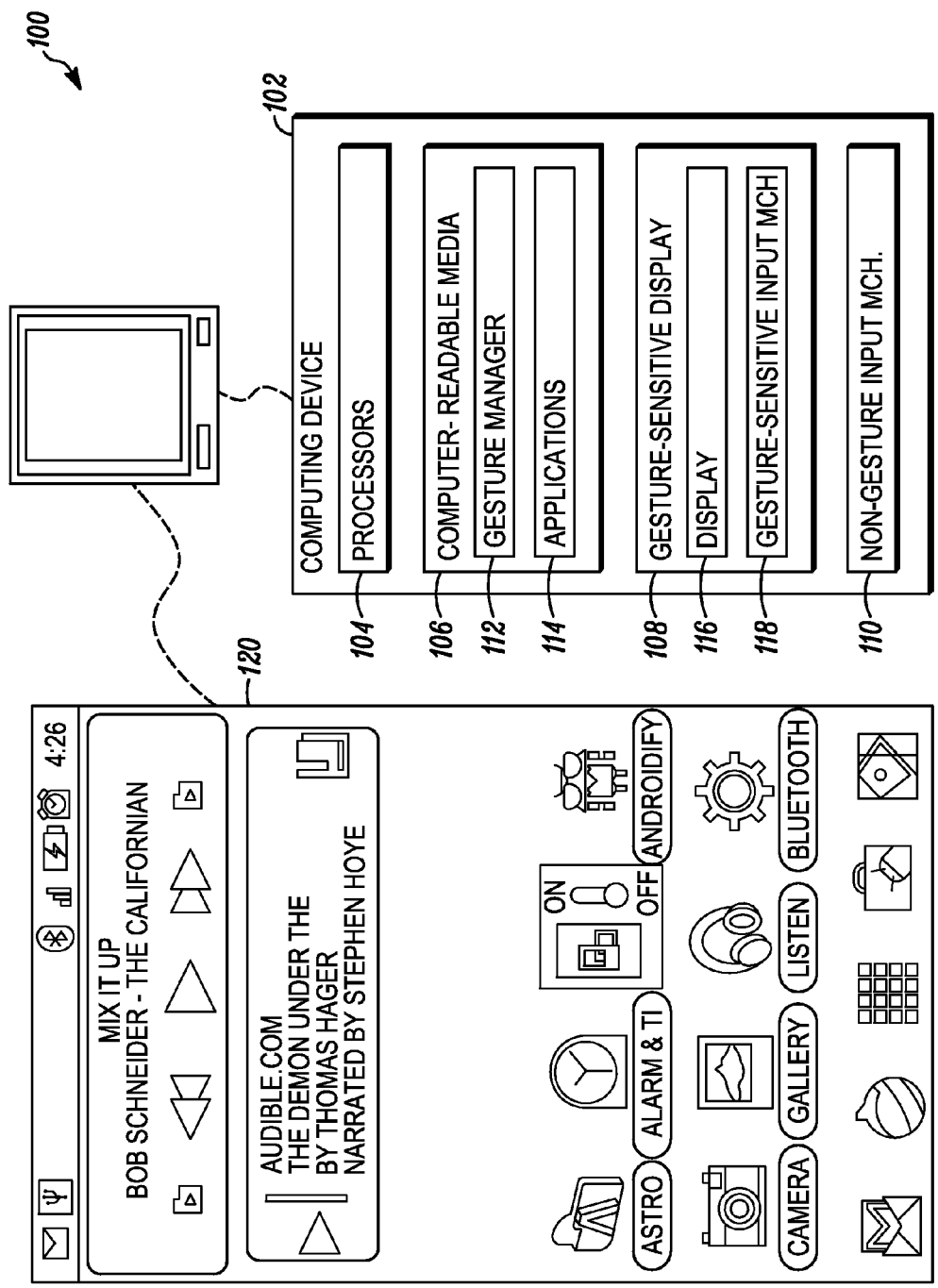
FIG. 1 illustrates an example environment in which techniques for gesture-enabled data bundling can be implemented.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Current information forums such as chat rooms and chat sessions provide a format with all participants having full access to each other. However, the ease of sharing among participants information such as emails, photos, and documents and being able to filter out "classified" content in a simple set of actions or gestures can be cumbersome, often requiring multi-key/command protocols with changes in screens.

As described herein, there is an opportunity to facilitate information exchange using a simple set of "selecting" and "assembling" actions to ease the interactive experience for the participants. In addition to forums such as chat rooms, the present methods and devices may be used anywhere that assembling data bundles in a direct and simplified manner is desired.

As used herein, a data bundle includes data such as emails, video, music, raw data (charts, text, numerics), etc. The present methods and devices provide a gesture-enabled tool that enables a user to assemble a data bundle using a single continuous gesture to select the items for the data bundle from a plurality of menus or lists and to deliver the data bundle to a recipient as part of the single continuous gesture. As used herein, a single continuous gesture is defined as a sequence of selections in a stepwise continuous gesture action.

FIG. 1 illustrates an example environment 100 in which techniques for gesture-enabled data selecting or bundling can be implemented. Example environment 100 includes a computing device 102 having one or more processors 104, computer-readable media 106, a gesture-sensitive display 108, and optional non-gesture input mechanisms 110.

Computer-readable media 106 include a gesture manager 112 and one or more applications, features, or capabilities 114 of the computing device 102. Applications 114 include social-media platforms such as chat rooms, hangouts, twitter, etc.

Computing device 102 is shown as a smart phone having a gesture-sensitive display 108, which acts as both a display 116 and a gesture-sensitive input mechanism 118. Gesture-sensitive input mechanism 118 is capable of receiving gesture inputs, such as human-touch or stylus-touch gestures, as well as motion gestures not having a touch element, Gesture-sensitive input mechanism 118 may include a motion-sensitive array, a micro-electro-mechanical systems inertial sensor, an accelerometer, and the like. Another type of gesture-sensitive input mechanism is an infrared sensor or video camera for detecting gestures (e.g., hand gestures) made in the near-vicinity of the computing device 102.

Non-gesture input mechanisms 110 can include keyboard buttons, a track ball, volume control buttons, a camera button, a power/standby button, voice commands, and the like. While not required, non-gesture inputs may be received and responded to by the techniques described herein.

Furthermore, various types of computing devices, displays, and input mechanisms may also or instead be used, such as a personal computer having a monitor, keyboard, and mouse, a laptop with an integrated display and keyboard with touchpad, a cellular phone with a small integrated display and a telephone keypad plus navigation keys, or a tablet computer with an integrated touch-sensitive display (e.g., a touch screen or other touch-sensitive sensors capable of receiving gestures made proximal to the display). In some of these cases, a gesture is not made directly over a display but is instead received over a display, such as a gesture received through a mouse or touch pad and shown on the display. Thus, a received gesture may be a mouse movement where the mouse pointer makes the motion over a label on the display. This may still be considered a gesture-sensitive display.

Environment 100 also illustrates an example home-screen interface 120 with various labels for applications 114.

Figure 2:
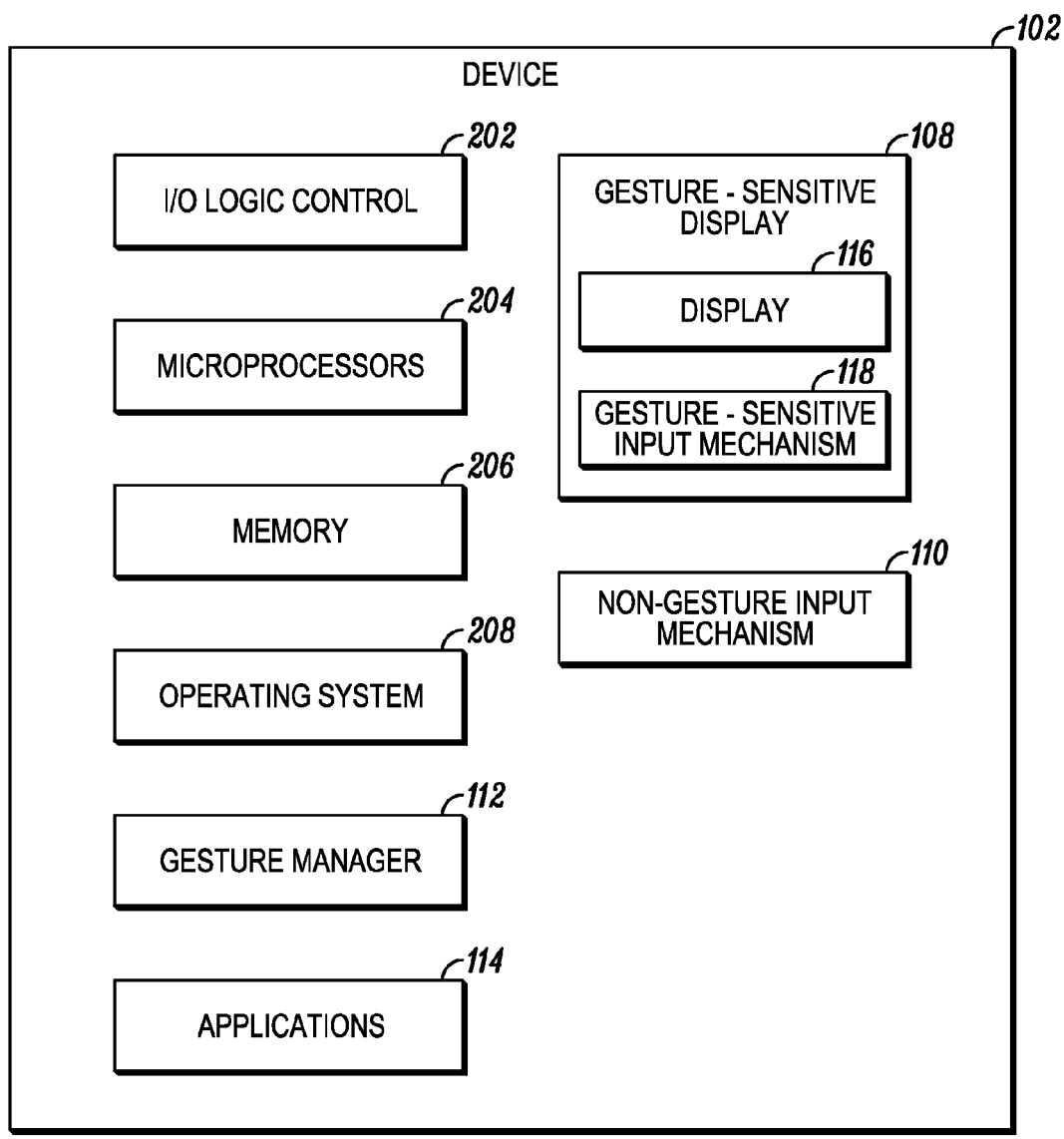
FIG. 2 illustrates various components of an example apparatus that can implement techniques for gesture-enabled data bundling.

FIG. 2 illustrates further components of example device 102 including gesture manager 112, applications 114, gesture-sensitive display 108 having display 116 and gesture-sensitive input mechanism 118, and non-gesture input mechanism 110. The components of device 102 can be implemented in hardware, firmware, software, or any suitable combination thereof.

Device 102 can be implemented in a fixed or mobile electronic device being one or a combination of a media device, computing device, television set-top box, video processing or rendering device, appliance device (e.g., a closed-and-sealed computing resource, such as some digital video recorders or global-positioning-satellite devices), gaming device, electronic device, in-vehicle computing platform, or workstation.

Device 102 can be integrated with electronic circuitry, a microprocessor, memory, input-output ("I/O") logic control, communication interfaces, and components, other hardware, firmware, or software needed to run an entire device. Example device 102 can also include an integrated data bus (not shown) that couples the various components of the computing device for data communication among the components.

Device 102 includes various components such as an I/O logic control 202 (e.g., to include electronic circuitry) and microprocessors 204 (e.g., microcontroller or digital signal processor). Device 102 also includes a memory 206, which can be any type of random-access memory, a low-latency nonvolatile memory (e.g., flash memory), read-only memory, or other suitable electronic data storage.

Device 102 can also include various firmware and software, such as an operating system 208, gesture manager 112, and applications 114, which can be computer-executable instructions maintained in memory 206 and executed by microprocessor 204. Device 102 can also include other various communication interfaces and components, wired or wireless local-area network or private-area network components, cellular transceivers, other hardware, firmware, and software.

Referring back to FIG. 1, in some embodiments gesture manager 112 is configured to provide a list of applications 114 and data from applications 114 that can be selected in an ordered assembly for execution and delivery to selected recipients. For example, in some embodiments, gesture manager 112 provides a plurality of lists which comprise one or more interactive list windows on interface 120.

Figure 3A:
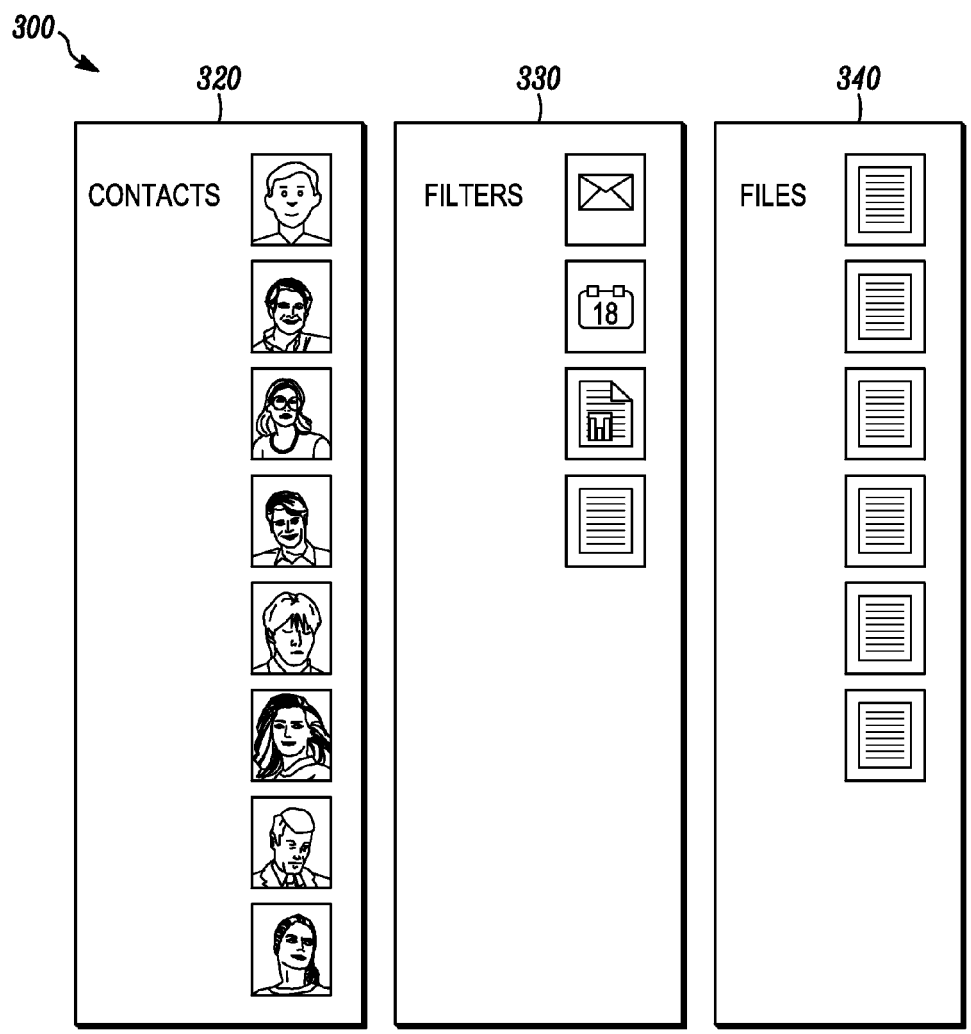
FIGS. 3A through 3C are generalized screen shots of example items in List Windows.
Figure 3B:
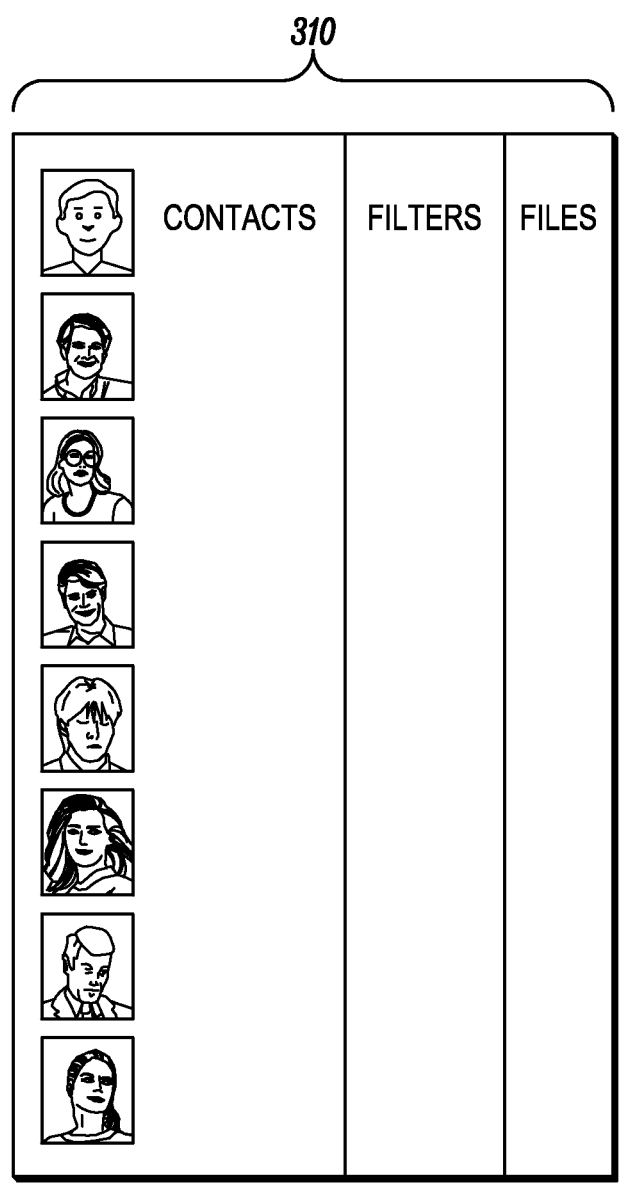

FIG. 3 illustrates an example list windows screen shot 300 provided by or facilitated by gesture manager 112. In some embodiments, list windows 310 (see FIG. 3B) include three primary lists: Contact manager 320, Filter manager 330, and File manager 340. The lists 320, 330, 340 can be openly laid out (as in FIG. 3A) or folded or slided like a card pack (FIG. 3B).

Contact manager 320 generally includes a directory of people/company/group/organization contact information which could include name, address, telephone number, etc. Filter manager 330 generally includes a configurable list of filters, which could include text-based and document-type filters. File manager 340 generally includes a filtered or unfiltered list of items, e.g. files to share, such as documents, calendar events, contact cards, etc.

List windows 310 facilitate the selection and assembly of accessible information. While shown as three primary lists in FIG. 3, any number of lists and corresponding content may be provided by gesture manager 112. In some embodiments, gesture manager 112 assembles the lists for list windows 310 by context of selection, filter, conversation, data being presented in chat room, etc. For example, if within the gesture, the participant selects a person from the contact list and then moves to email, then all emails to or from the person selected in the previous step are extracted and presented for further selection.

In some embodiments, a user may add to or modify the lists in list windows 310. For example, the user may add a text-based or Boolean search field to Filter manager 330 or add contacts to the Contact manager 320. In some embodiments, the user may add a field such as "delete name" to Filter manager 330 to prevent a conversation to or from a particular contact in, for example, an email before bundling and sending to a recipient.

In some embodiments, gesture manager 112 assembles lists based on the ability of the data or content to be manipulated by gestures. For example, gesture manager 112 may assemble all applications 114 and related data configured to be gesture-enabled and provide these applications 114 as lists in list windows 310.

As used herein, a gesture is a motion by the user to signal the desire for an action to be taken. Consequently, gesture-enablement is the ability of an application to understand and react to the intent of the user through a motion. Thus, a fade, slide in, slide out, swipe, scroll, throw, flick, shake, are all gestures that may be used to select and bundle data. In addition, a camera may be used to detect gestures by eye tracking or monitoring hand gestures.

Still referring to FIGS. 3A and 3B, each of lists 320, 330, 340 is configured to dynamically adapt to changes with the selection of content. For example, as data or content items from each list 320, 330, or 340 are selected the number of relevant items in each of the other lists 320, 330, or 340 are reduced. This reduction in list items may be based on metadata from the selected items.

Figure 3C:
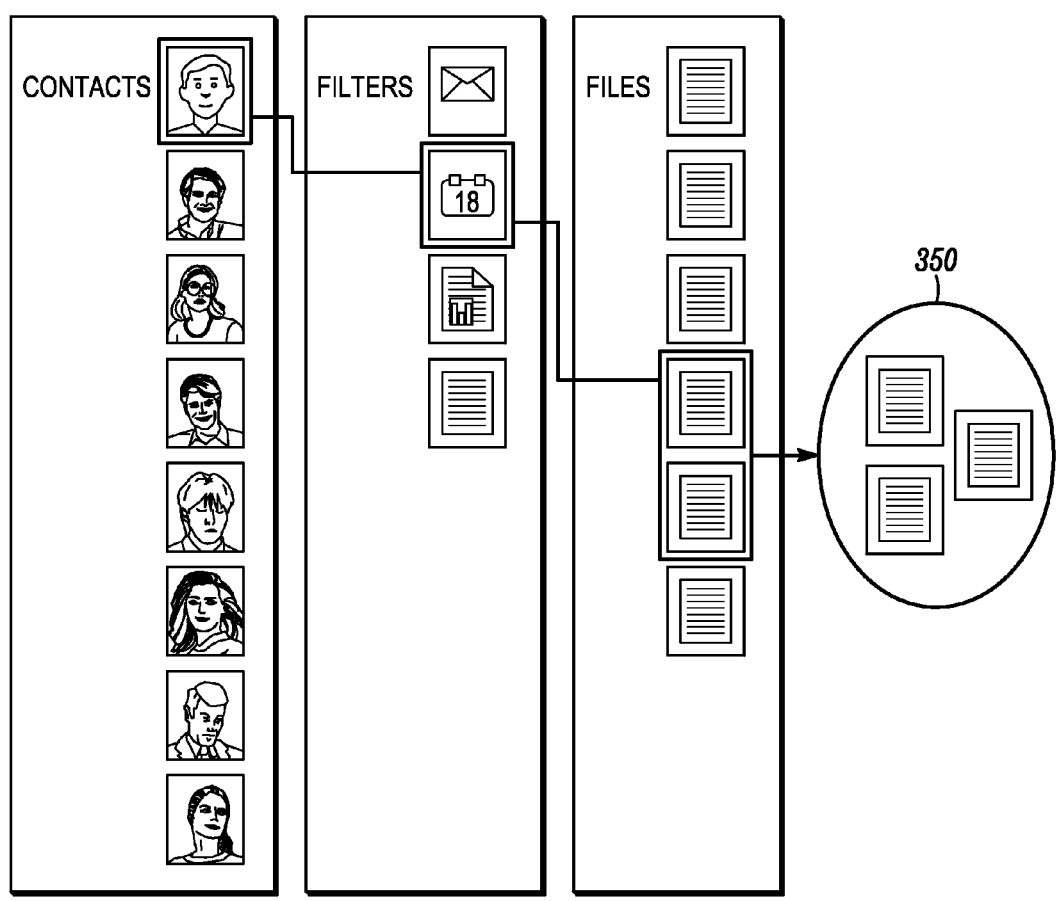

In an example shown in FIG. 3C, a user first selects an item in list windows 310, e.g., a contact by scrolling through the Contact manager 320. The user then navigates over Filter manager 330 to bring it up and select a filter. The user then navigates over File manager 340 to bring up and select a file. As shown, a data bundle 350 comprising the filtered-out files has been assembled based on the user's selections from lists 320, 330, 340. As used herein, a data bundle can includes data such as emails, video, music, raw data (charts, text, numerics), etc.

While shown in the order 320, 330, 340, the order of selection within list window managers 320, 330, 340 can be in any combination. This provides flexibility to facilitate choice based on context. Furthermore, in some embodiments, the creation of data bundles may be performed using a single, continuous gesture such as a single swipe that the user moves from one list manager to another to select and then to send the data bundles to the desired recipients.

As another example, a user selects a contact ("contact#1") from the Contact manager 320 and then slides to the Filter manager 330 and selects a filter ("email"). Gesture manager 112 automatically searches through available emails with the contact#1 name in them and displays or presents these emails in File manager 340. On producing these emails with the contact#1 name, the gesture manager 112 may determine that there are additional related contacts ("contact#2" and "contract #3") within the user's Contact manager 320: They may be related because they are recipients to the emails from contact#1. In some embodiments, the gesture manager 112 would filter out and only display these related contacts in Contact manager 320. The user then has the opportunity to further filter within Contact manager 320 for contact#1, contact#2, and contact#3 if desired, then bundle the files and send to a recipient.

Figure 4A:
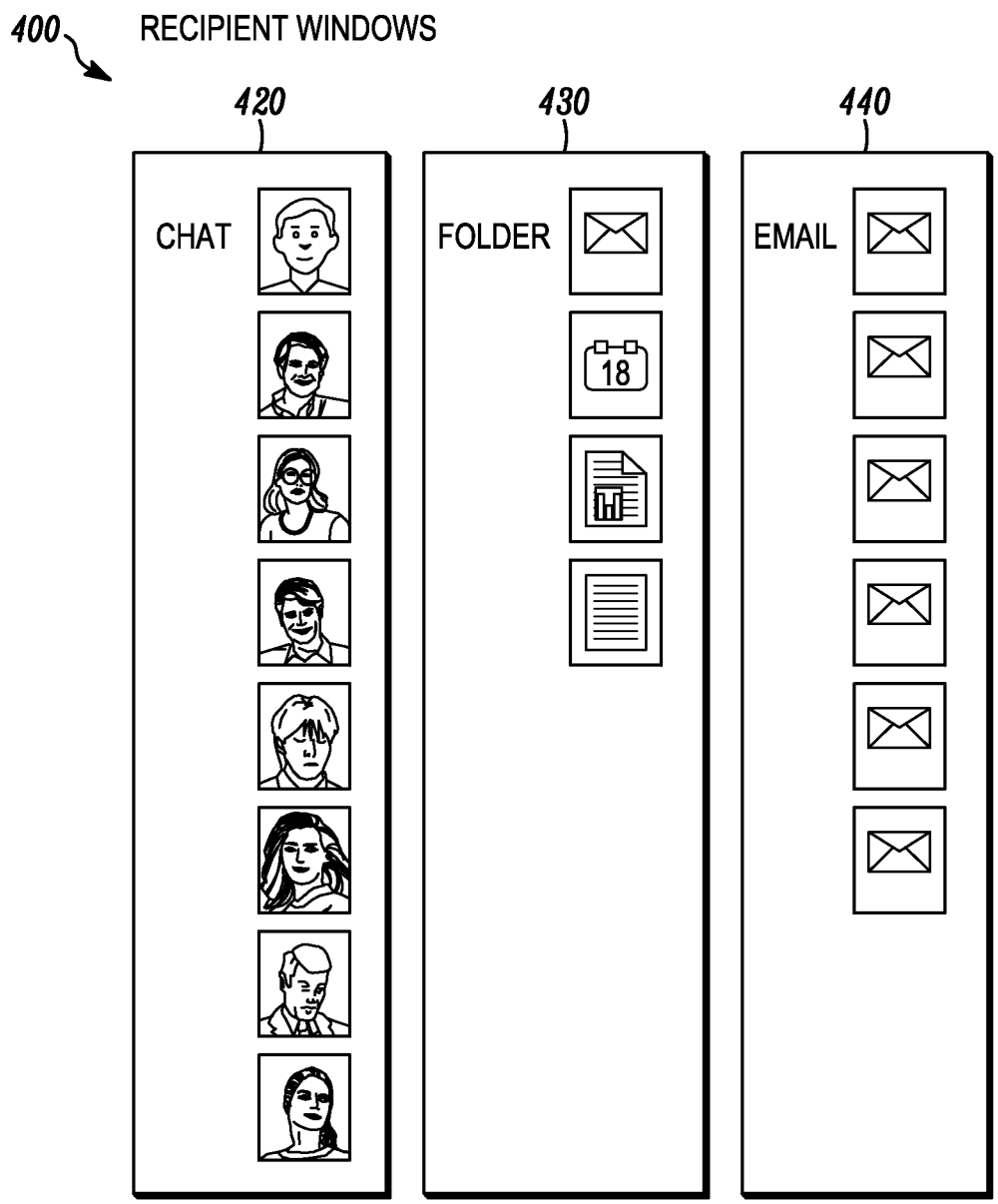
FIGS. 4A and 4B are generalized screen shots of example items in Recipient Windows.
Figure 4B:
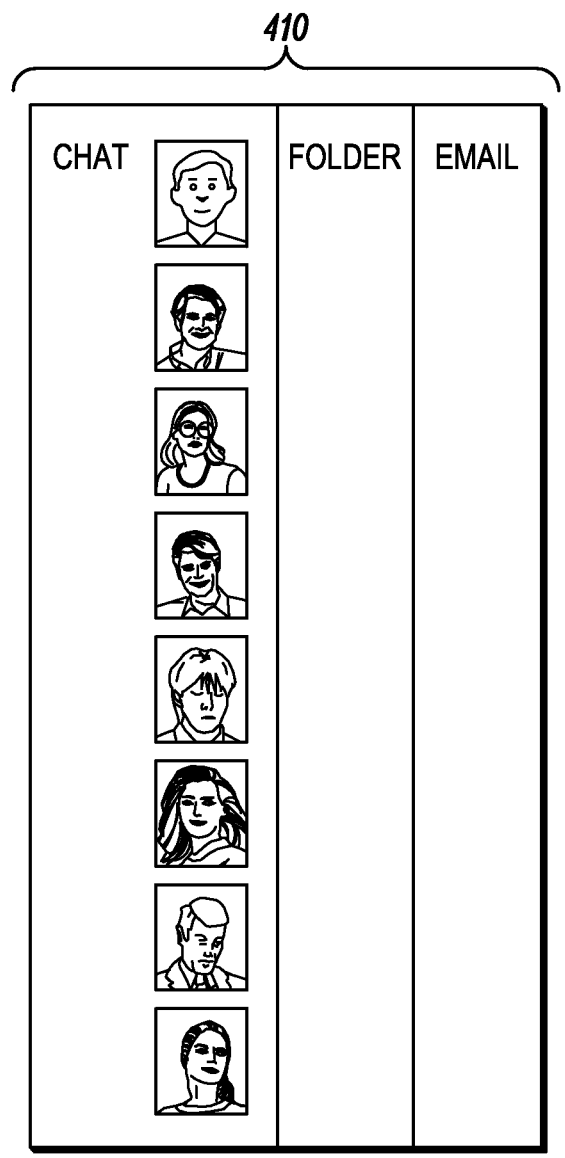

In addition to list windows 300, gesture manager 112 also provides a plurality of lists which comprise one or more interactive recipient windows on interface 120. FIG. 4A illustrates an example recipient windows screen shot 400 provided by or facilitated by gesture manager 112. In some embodiments, recipient windows 410 (see FIG. 4B) include three primary lists: Chat forum 420, Folder archive 430, and Email attachment 440. The lists 420, 430, 440 can be openly laid out (FIG. 4A) or folded or slided like a card pack (FIG. 4B).

Recipient windows 410 facilitate the selection of where to deliver data bundle 350. While shown as three primary lists in FIGS. 4A and 4B, any number of lists and corresponding content may be provided by gesture manager 112. In some embodiments, gesture manager 112 assembles the lists for recipient windows 410 by context of selection, filter, conversation, data being presented in chat room, music being played, etc. In some embodiments, gesture manager 112 assembles lists based on the ability of the recipient to receive data bundles from the user.

Figure 5:
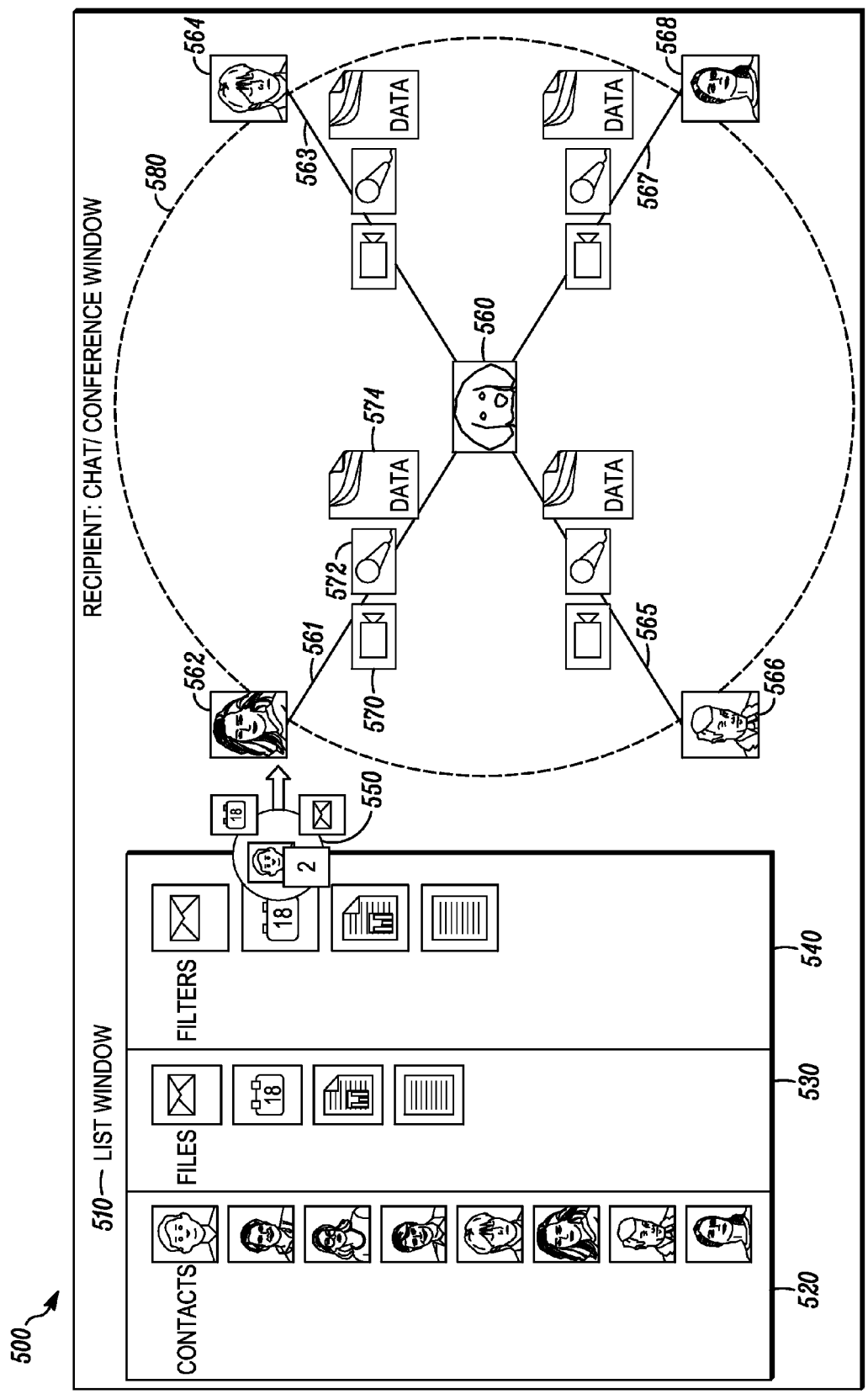
FIG. 5 is a generalized screen shot of an example data bundle assembled for a chat room session.

FIG. 5 is a generalized screen shot 500 of an example data bundle assembled for a chat room session. As explained above, a user 560 selects a data bundle 550 from navigating and choosing items from list window 510 (e.g. from Contacts manager 520, Files manager 530, and Filters manager 540). As shown, the user 560 is engaged in a chat room session or a conference window 580 with four other participants 562, 564, 566, and 568. The connections from user 560 to the other participants 562, 564, 566, and 568 are shown as 561, 563, 565, and 567, respectively. Between the user 560 and any participant, certain privileges such as sharing video 570, sharing audio 572, and screen sharing 574 may exist. These privileges may vary from participant to participant.

In order for the user 560 to send the data bundle 550 to one or more participants, 562, 564, 566, and 568, the user 560 may simply drag the data bundle 550 to each participant 562, 564, 566, and 568 to whom the data bundle 550 is to be sent. If all participants 562, 564, 566, and 568 are intended recipients, then the user 560 can simply drag the data bundle 550 into the chat room window 580.

In some embodiments, one or more of the participants 562, 564, 566, and 568 can view the user's list window 510. In some embodiments, the participants 562, 564, 566, and 568 can request data bundles 550 of interest and accessible to the participants 562, 564, 566, and 568. Such requests can be made to user 560 by a participant 562, 564, 566, 568 similarly assembling a data bundle 550 from the user's list window 510 and waiting for the user to drag the data bundle 550 to the intended recipient or to approve the formed data bundle 550. For example, participant 562 could create a request by sliding over a filter, e.g. music, then over name, e.g. Dido, and place that request over user 560. The system supporting conference window 580 could then assemble a data bundle of all Dido music resident on user 560's computer and place it on participant 562, with a send question, which 560 could approve. Here user 560 is aware that a request is made, which he could deny if desired.

In some embodiments, the user 560 may be prompted to enter a password or provide another means for authentication before sending data bundle 550 to its intended recipients. Such a password or authentication may be invoked whenever, e.g., a chat session has been dormant or inactive for a while or if the user 560 has not been actively engaged in the chat. Alternatively, in some embodiments, data bundle 550 may be queued to be sent to a particular recipient, but the data bundle 550 may sit for a predetermined time period before actually being sent, in case the user 560 desires to cancel the data bundle 550 to the recipient for any reason, including user error.

Figure 6:
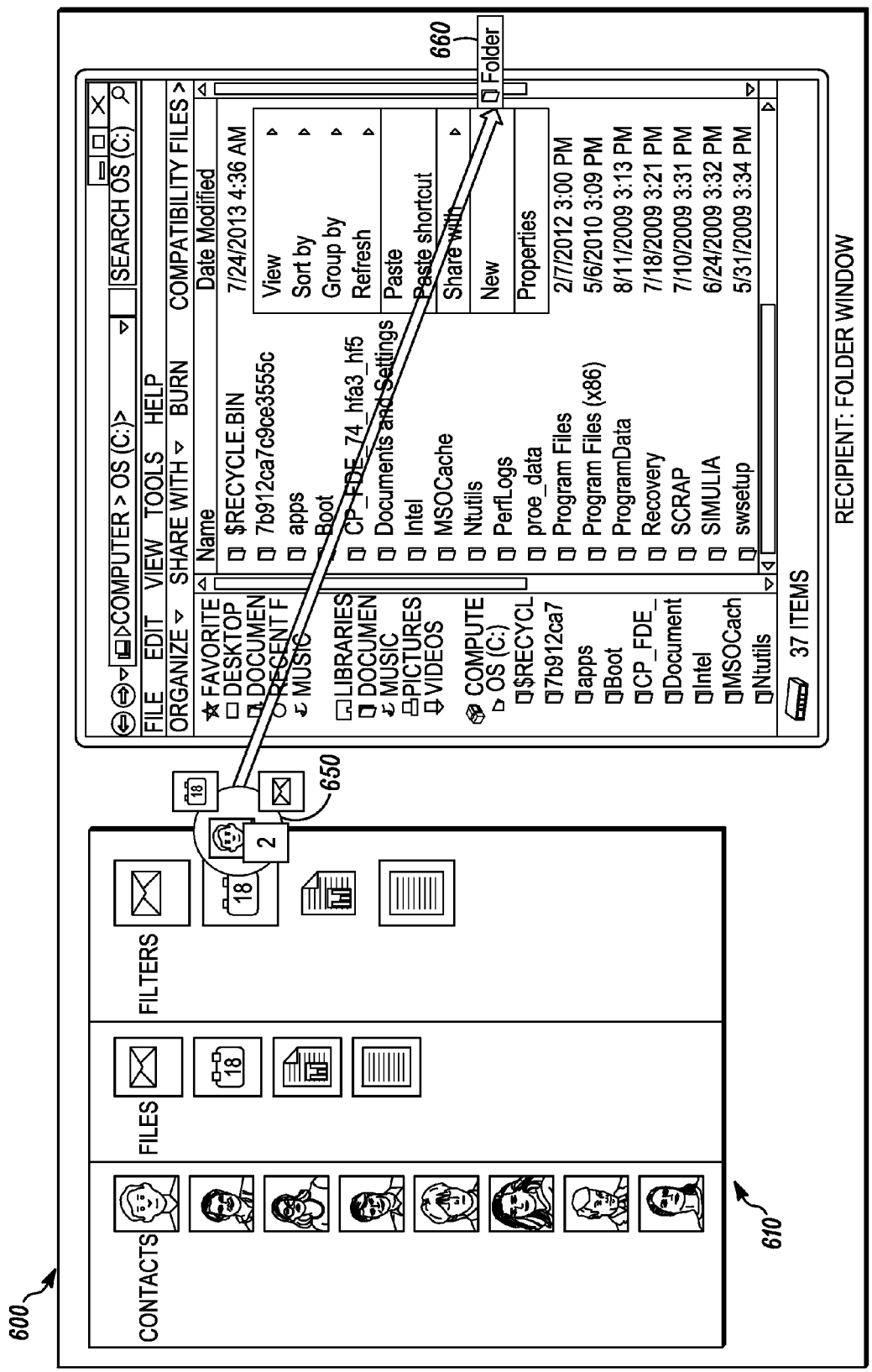
FIG. 6 is a generalized screen shot of an example data bundle assembled for an archive folder.

FIG. 6 is a generalized screen shot 600 of an example data bundle assembled for an archive folder. As explained above, a user selects a data bundle 650 from navigating and choosing items from list window 610. In some embodiments, the user right-clicks or performs a comparable operation to save data bundle 650 in a folder 660 in a directory.

Figure 7:
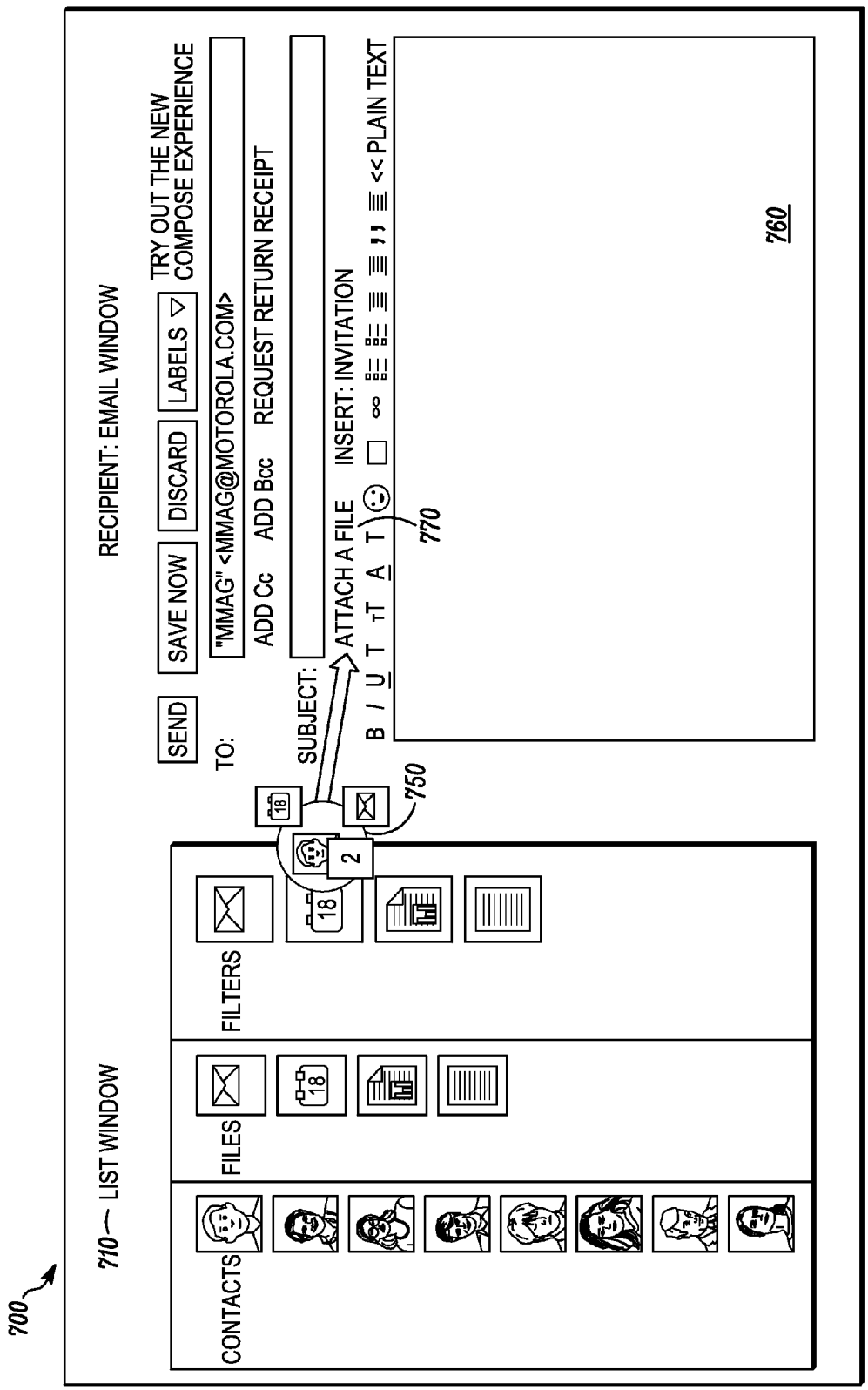
FIG. 7 is a generalized screen shot of an example data bundle assembled for an email attachment.

FIG. 7 is a generalized screen shot 700 of an example data bundle assembled for an email attachment. As explained above, a user selects a data bundle 750 from navigating and choosing items from list window 710. In some embodiments, the user right-clicks or performs a comparable operation to attach data bundle 750 to an email 760. Alternatively, the user may simply drag data bundle 750 over the email attachment icon 770.

Figure 8:
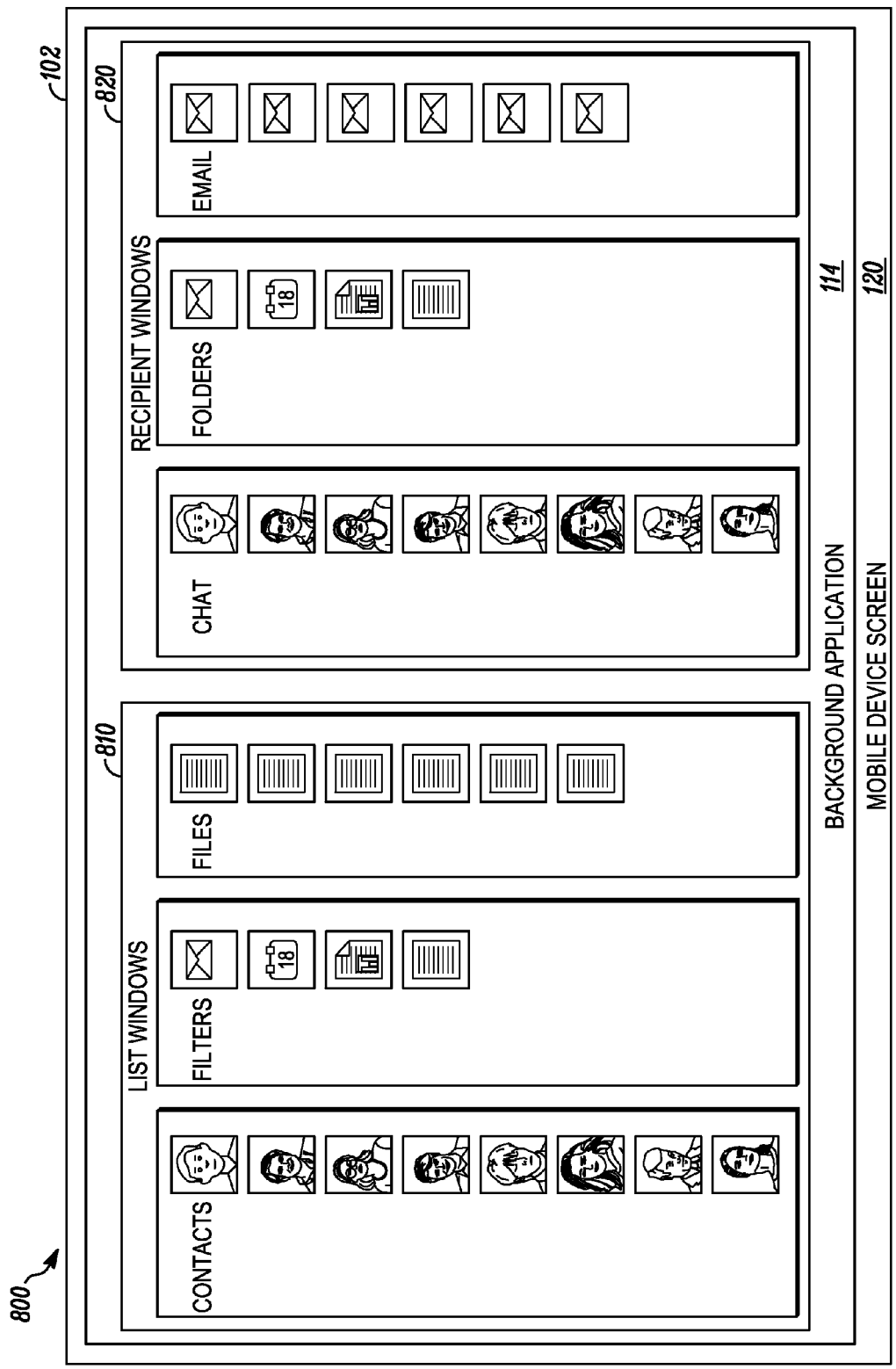
FIG. 8 is a generalized screen shot a user may see when assembling data bundles.

FIG. 8 is a generalized screen shot 800 a user may see when assembling data bundles on a device 102. In some embodiments, a background application 114 is running on home-screen interface 120. The background application 114 may be a chat room session such as described above with reference to FIG. 5. When preparing and assembling data bundles, the user is provided with two interactive windows: list windows 810 and recipient windows 820. The user can elect the data from the list windows 810 to create a data bundle and then move the data bundle to the desired recipient in the recipient windows 820.

Figure 9:
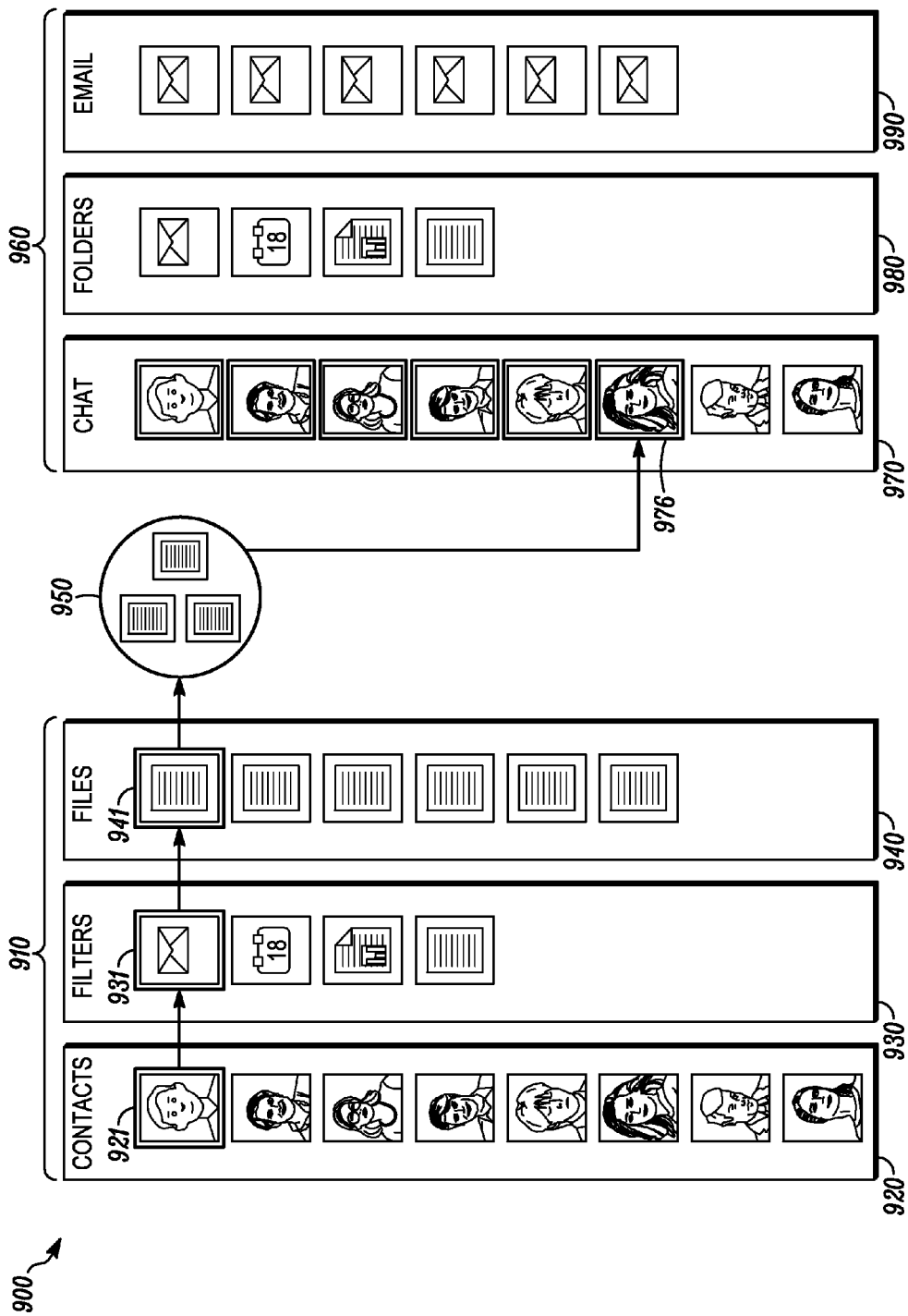
FIG. 9 is an example screen shot a user may see when assembling a particular data bundle.

FIG. 9 is an example screen shot 900 a user may see when assembling a particular data bundle. In screen shot 900, a user selects a plurality of filtered items from list windows 910. As shown, the user selects a first contact 921 from Contact manager 920, a first filter 931 from Filter manager 930, and a first file 941 from File manager 941. The assembled data bundle 950 is then transferred to a sixth participant 976 in Chat session manager 970 of recipient list windows 960. In the present example, Archive folder manager 980 and email attachment manager 990 are not used.

Figure 10:
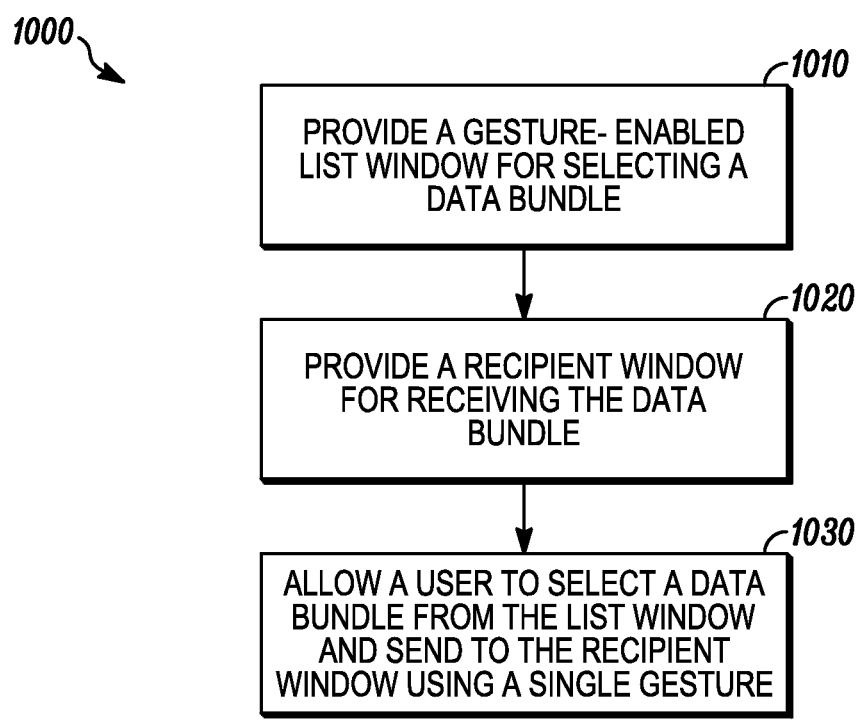
FIG. 10 is a flowchart of a representative overall method for assembling a data bundle in a single gesture.

FIG. 10 is a flowchart of a representative overall method 1000 for assembling a data bundle in a single gesture. In a first step 1010, a user is provided with a gesture-enabled list window for selecting a data bundle. In second step 1020, the user is provided with a recipient window for receiving the data bundle. In third step 1030, the user is allowed to select or assemble a data bundle from the list window and to send the data bundle to the recipient window using a single gesture.

Figure 11:
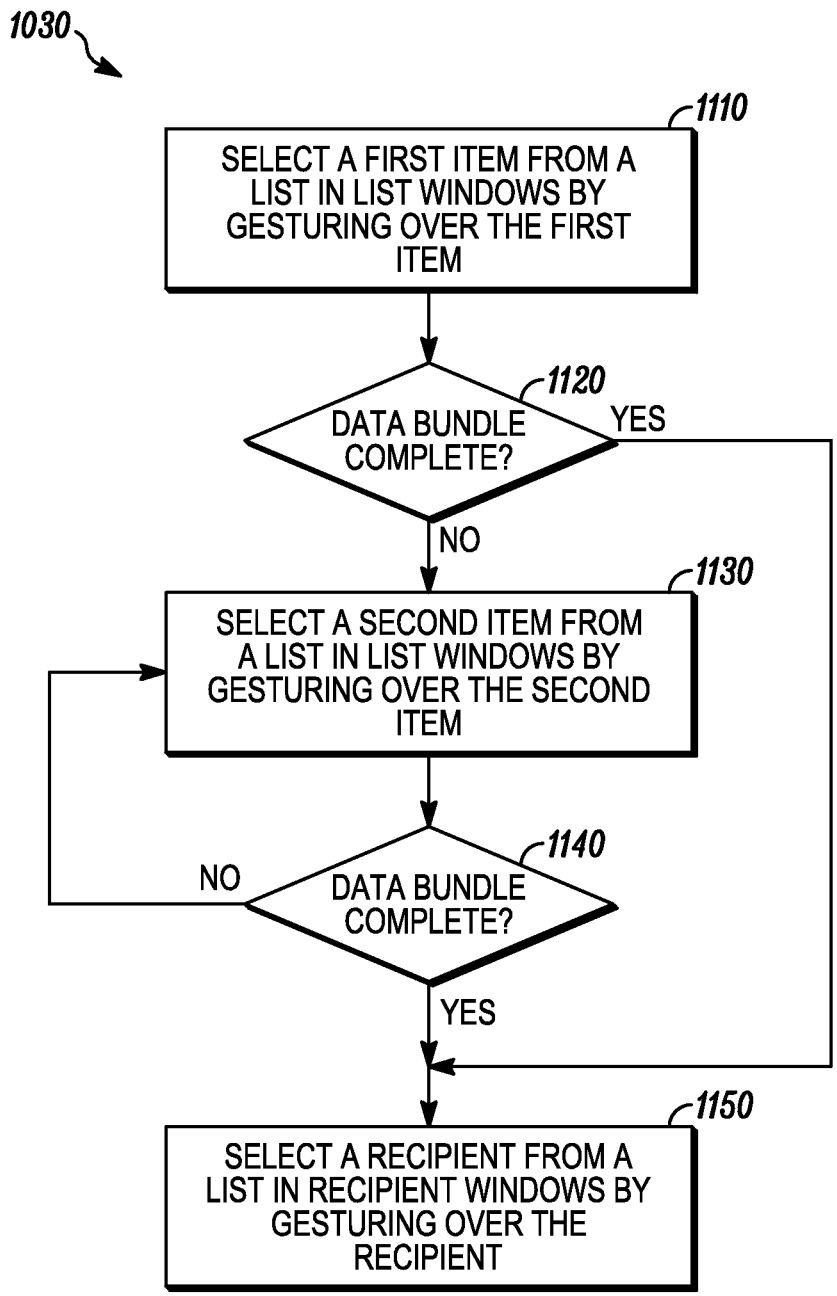
FIG. 11 is a flowchart of a detailed method for assembling a data bundle in a single gesture.

FIG. 11 is a flowchart of a detailed method 1030 for assembling a data bundle in a single gesture. As shown, method 1030 illustrates the last step of FIG. 10 in more detail.

In a first step 1110, a user selects a first data item from a list in the list window by gesturing over the first item. The user then determines whether or not the data bundle is complete at step 1120. If the user decides that the data bundle is not complete, then the user then selects a second item from a list in the list window by gesturing over the second item (step 1130). The user once again determines whether or not the data bundle is complete at step 1140. If not, then steps 1130 and 1140 may be repeated until the user decides that the data bundle is complete. Once the user decides the data bundle is complete, at step 1150, the user selects a recipient from a list in the recipient window by gesturing over the recipient. While not shown explicitly, the user may select more than one recipient by repeating step 1150.

An example of applying FIG. 11 to a user's creation of a data bundle may be described as follows. At step 1110, a user selects a contact from Contact manager. At step 1120, the user decides that the data bundle is not complete. At step 1130, the user continues to swipe over Filter manager and selects "email." This would cause all the possible emails from the selected contact to be dynamically filtered out and presented. At step 1140, the user decides the data bundle is not complete. The user then could select the relevant emails from Files manager. For example, the user may wish to further filter out data, such as data information from any emails in the list, which means the user would return the swipe over the Filter manager again.

Once the data collection and filters are assembled in a data bundle or a collection, they can then be released or delivered to a destination or recipient at step 1150. For example, the recipient could be a chat room, a folder, an attach-list to an email, etc.

In a first aspect, a method for sharing data on an electronic device having a display is disclosed including: providing a list window for selecting the data bundle; providing a recipient window for receiving the data bundle; enabling a user through a sequence of selections to a collect data bundle from the list window using a single continuous gesture such that the data bundle is delivered to the recipient window as part of the single continuous gesture. In an embodiment of the first aspect, the list window includes an element selected from the group consisting of: contact list, filter list, and files list. In an embodiment of the first aspect, the contact list includes a list of contacts available to the user. In an embodiment of the first aspect, the filter list includes a list of filters available to the user. In an embodiment of the first aspect, the filters include an element selected from the group consisting of: electronic mail, calendar dates, attachments, text, photos, and music. In an embodiment of the first aspect, the user is allowed to create a filter by entering a filter term or dragging a filter item into the filter list. In an embodiment of the first aspect, the files list includes a list of data files available to the user. In an embodiment of the first aspect, the recipient window includes a destination for sending the data bundle. In an embodiment of the first aspect, the recipient window includes an element selected from the group consisting of: a folder, a forum, a recipient, and an email. In an embodiment of the first aspect, the user selects a data bundle by identifying an item from the list window using a gesture that selects the item after a predetermined amount of time passes. In an embodiment of the first aspect, the user selects a data bundle by identifying at least two items from different lists. In an embodiment of the first aspect, when a user selects a data bundle, metadata associated with the data bundle are dynamically changed to reflect the data bundle selection. In an embodiment of the first aspect, a data bundle includes an item selected from the list window. In an embodiment of the first aspect, a single gesture includes an element selected from the group consisting of: a swipe, slide, scroll, throw, or flick by the user. In an embodiment of the first aspect, the list window is visible to the recipient window. In an embodiment of the first aspect, a recipient can request a data bundle from the user.

In a second aspect, an electronic device is disclosed including: a display configured to provide a user with a gesture-enabled selection tool; a processor; and a program stored in memory and configured to be executed by the processor, the program including instructions for: providing a list window for selecting the data bundle; providing a recipient window for receiving the data bundle; and enabling a user through a sequence of selections to collect a data bundle from the list window using a single continuous gesture such that the data bundle is delivered to the recipient window as part of the single continuous gesture, wherein the recipient window and list window together compose the gesture-enabled selection tool. In an embodiment of the second aspect, the electronic device includes an element selected from the group consisting of: a mobile phone, a tablet, a laptop, a desktop computer, a personal digital assistant, a global positioning system, and a video gaming device.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:
1. A method comprising:
outputting, by an electronic device and for display at a gesture-sensitive display, at least one list window and at least one recipient window;
receiving, by the electronic device, based on a first part of a single continuous gesture received at the gesture-sensitive display, an indication of a selection of a data item in a first list of the at least one list window, wherein the first list comprises a contact list, and wherein the data item comprises a contact included in the contact list;
receiving, by the electronic device, based on a second part of the single continuous gesture received at the gesture-sensitive display, an indication of a selection of a filter in a second list of the at least one list window;
responsive to receiving the indication of the selection of the filter, determining, by the electronic device, based on the selection of the data item in the first list and the selection of the filter in the second list, a filtered list of data items;
outputting, by the electronic device and for display at the gesture-sensitive display, the filtered list of data items in a third list of the at least one list window;
receiving, by the electronic device, based on a third second part of the single continuous gesture received at the gesture-sensitive display, an indication of a selection of at least one data item from the filtered list of data items included in the third list of at least one list window;
assembling, by the electronic device, based on the selection of the at least one data item from the filtered list of data items included in the third list, a data bundle; and responsive to receiving, by the electronic device, based on a fourth part of the single continuous gesture received at the gesture-sensitive display, an indication of a selection of the at least one recipient window, delivering, by the electronic device, the data bundle to the recipient window.

2. The method of claim 1, wherein the third list of the at least one window comprises a files list.

3. The method of claim 1, wherein the filter in the second list is associated with an email, calendar dates, attachments, text, photos, videos, or music.

4. The method of claim 2, wherein the files list comprises a list of data files available to a user of the electronic device.

5. The method of claim 1, wherein the at least one recipient window comprises a window associated with a folder, a forum, a recipient, or an email.

6. The method of claim 1, wherein receiving the indication of the selection of the at least one data item from the filtered list of data items included in the third list comprises:
receiving, by the electronic device, a first data item from the filtered list of data items; and
receiving, by the electronic device, a second data item from the filtered list of data items,
wherein the data bundle includes the first data item and the second data item.

7. The method of claim 1, further comprising:
responsive to assembling the data bundle, dynamically changing, by the electronic device, metadata associated with the data bundle to reflect selection of the data bundle.

8. The method of claim 1, wherein the single continuous gesture comprises a swipe gesture, a slide gesture, a scroll gesture, a throw gesture, or a flick gesture.

9. An electronic device, comprising:
a gesture-sensitive display;
at least one processor; and
a memory, wherein the memory stores instructions that are executable by the at least one processor to:
output, for display at the gesture-sensitive display, at least one list window and at least one recipient window;
receive, based on a first part of a single continuous gesture received at the gesture-sensitive display, an indication of a selection of a data item in a first list of the at least one list window, wherein the first list comprises a contact list, and wherein the data item comprises a contact included in the contact list;
receive, based on a second part of the single continuous gesture received at the gesture-sensitive display, an indication of a selection of a filter in a second list of the at least one list window;
responsive to receiving the indication of the selection of the filter, determine, based on the selection of the data item in the first list and the selection of the filter in the second list, a filtered list of data items;
output, for display at the gesture-sensitive display, the filtered list of data items in a third list of the at least one list window;
receive, based on a third part of the single continuous gesture received at the gesture-sensitive display, an indication of a selection of at least one data item from the filtered list of data items included in the third list of at least one list window;
assemble, based on the selection of the at least one data item from the filtered list of data items included in the third list, a data bundle; and
responsive to receiving, based on a fourth part of the single continuous gesture received at the gesture-sensitive display, an indication of a selection of the at least one recipient window, delivering, by the electronic device, the data bundle to the recipient window.

10. The electronic device of claim 9, wherein the electronic device comprises a mobile phone, a tablet, a laptop, a desktop computer, a personal digital assistant, a global positioning system, or a video gaming device.

11. The electronic device of claim 9, wherein the third list of the at least one window comprises a files list.

12. The electronic device of claim 9, wherein the filter in the second list is associated with an email, calendar dates, attachments, text, photos, videos, or music.

13. The electronic device of claim 9, wherein the at least one recipient window comprises a window associated with a folder, a forum, a recipient, or an email.

14. The electronic device of claim 9, wherein the instructions that are executable by the at least one processor to receive the indication of the selection of the at least one data item from the filtered list of data items included in the third list comprise instructions that are executable by the at least one processor to:
receive, a first data item from the filtered list of data items; and
receive, a second data item from the filtered list of data items,
wherein the data bundle includes the first data item and the second data item.

15. The electronic device of claim 9, wherein the single continuous gesture comprises a swipe gesture, a slide gesture, a scroll gesture, a throw gesture, and or a flick gesture.

* * * * *

UNITED STATES PATENT AND TRADEMARK OFFICE
CERTIFICATE OF CORRECTION

PATENT NO. : 9,524,079 B2  
APPLICATION NO. : 14/107556  
DATED : December 20, 2016  
INVENTOR(S) : Martin R. Pais et al.

Page 1 of 1

It is certified that error appears in the above-identified patent and that said Letters Patent is hereby corrected as shown below:

Column 8, Lines 59-60 (Claim 1): Replace "a third second part" with --a third part--

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*